United States Patent [19]
Chamberlain et al.

[11] Patent Number: 5,173,537
[45] Date of Patent: Dec. 22, 1992

[54] SELECTIVE HYDROGENATION OF CONJUGATED DIOLEFIN POYLMERS

[75] Inventors: Linda Rae Chamberlain, Richmond; Carma J. Gibler, Houston, both of Tex.

[73] Assignee: Shell Oil Company, Houston, Tex.

[21] Appl. No.: 811,219

[22] Filed: Dec. 20, 1991

[51] Int. Cl.$^5$ ................................................ C08F 8/04
[52] U.S. Cl. .................... 525/105; 525/330.8; 525/330.9; 525/333.1; 525/333.2; 525/338; 525/339
[58] Field of Search .......................... 525/338, 339, 105

[56] References Cited

U.S. PATENT DOCUMENTS

| | | | |
|---|---|---|---|
| 4,076,914 | 2/1978 | Moczygemba et al. | 526/25 |
| 4,076,915 | 2/1978 | Trepka | 526/25 |
| 4,501,857 | 2/1985 | Kishimoto et al. | 525/338 |
| 4,656,230 | 4/1987 | Shyr et al. | 525/332.8 |
| 4,673,714 | 6/1987 | Kishimoto et al. | 525/314 |
| 4,994,508 | 2/1991 | Shiraki et al. | 524/14 |
| 5,017,660 | 5/1991 | Hattori et al. | 525/338 |
| 5,039,755 | 8/1991 | Chamberlain et al. | 525/338 |

FOREIGN PATENT DOCUMENTS

| | | |
|---|---|---|
| 302505 | 8/1987 | European Pat. Off. |
| 0339986 | 4/1989 | European Pat. Off. |
| 0398758 | 5/1990 | European Pat. Off. |
| 61-047706 | 8/1984 | Japan |
| 60-252643 | 12/1985 | Japan |
| 62-209102 | 9/1987 | Japan |
| 62-209103 | 9/1987 | Japan |
| 1175640 | 3/1968 | United Kingdom |

Primary Examiner—Bernard Lipman
Attorney, Agent, or Firm—Donald F. Haas

[57] ABSTRACT

This is an improvement in a process for the hydrogenation of conjugated diolefin polymers which comprises polymerizing or copolymerizing at least one conjugated diolefin with an organo alkali metal polymerization initiator in a suitable solvent thereby creating a living polymer, terminating the polymerization by the addition of hydrogen, thereby generating an alkali metal hydride, and effecting selective hydrogenation of the unsaturated double bonds in the conjugated diolefin units of the terminated polymer by contacting the polymer, in the absence of hydrocarbon lithium and alkoxy lithium compounds, with hydrogen in the presence of at least one bis(cyclopentadienyl)titanium compound. The improvement comprises treating the polymer, before hydrogenation, with a reagent to increase catalyst activity, the reagent being such that it will react with the alkali metal hydride present in the polymer.

16 Claims, No Drawings

SELECTIVE HYDROGENATION OF CONJUGATED DIOLEFIN POYLMERS

BACKGROUND OF THE INVENTION

The present invention relates to an improved process of the production of selectively hydrogenated polymers of conjugated dienes and more particularly to such a process utilizing a titanium hydrogenation catalyst.

U.S. Pat. No. 5,291,990 describes a process for the hydrogenation of conjugated diolefin polymers which first involves the polymerization of copolymerization of such monomers with an organo alkali metal polymerization initiator in a suitable solvent thereby creating a living polymer. The living polymer is terminated by the addition of hydrogen. Finally, selective hydrogenation of the unsaturated double bonds in the conjugated diolefin units of the terminated polymer is carried out in the presence of at least one bis(cyclopentadienyl)titanium compound preferably of the formula:

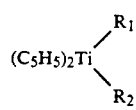

wherein $R_1$ and $R_2$ are the same or different and are selected from the groups consisting of halogens, $C_1$-$C_8$ alkyl and alkoxyls, $C_6$-$C_8$ aryloxys, aralkyls, cycloalkyls, silyls and carbonyls. The hydrogenation step is carried out in the absence of hydrocarbon lithium and alkoxy lithium compounds.

We have found that the above process, while being extremely advantageous for the hydrogenation of most polymers, has some disadvantages. We have discovered that for low molecular weight polymers, i.e. molecular weights (true peak molecular weight determined by gel permeation chromatography) below about 100,000 and/or where the polymer concentration in solution is high, the above process may produce an excess of lithium hydride which appears to be detrimental to the successful hydrogenation because an excess of alkali metal, usually lithium, hydride (LiH) may aid in the ultimate destabilization of the hydrogenation catalyst. This problem is most evident when low levels of bis(cyclopentadienyl)titanium compounds are used. This problem could also occur when higher molecular weight polymers are hydrogenated when such polymers are in solution in higher than the normal concentrations (i.e. more than about 15 to about 35%).

SUMMARY OF THE INVENTION

The present invention is an improvement upon the process described above. The polymer solution containing the alkali metal hydride, usually LiH, is reacted with a reagent. Generally, only a small amount of the reagent is needed to increase hydrogenation catalyst activity. It is vital that only the excess hydride be reacted with the reagents. If too much hydride is reacted, the catalyst system will not be effective in hydrogenating the polymer. The hydride:Ti molar ratio should not be reduced to below about 6:1.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and antrhacenyl derivatives. It is preferred to use an organoalkali metal (such as sodium or potassium) compound in a suitable solvent at a temperature within the range from about $-150°$ C. to about $300°$ C., preferably at a temperature within the range of about $0°$ C. to about $100°$ C. Particularly effective anionic polymerization initiators are organolithium compounds have the general formula:

$$RLi_n$$

Wherein:
R is an aliphatic, cycloaliphatic, aromatic or alkyl-substituted aromatic hydrocarbon radical having from 1 to about 20 carbon atoms; and
n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimentyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl aphthalenes and the like.

The polymers which can be used in accordance with the process of this invention include all of those described in the aforementioned U.S. Pat. No. 5,291,990 which is herein incorporated by reference. In the production of all of these, the polymerization is terminated by utilizing hydrogen gas in place of the conventionally used alcohol terminating agent. The living polymer, of more accurately, the living end of the polymer chain, is terminated by the addition of hydrogen thereto. The theoretical termination reaction is shown using an styrene-butadiene-styrene block copolymers for exemplary purposes:

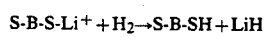

As shown above, it is theorized that lithium hydride is formed during the termination process. Formed in this manner, it is not a reactive polymerization initiator. It is inert to polymerization and does not interfere with the molecular weight control of the next polymerization batch as alcohol can.

It is usually advisable to contact and vigorously mix the gas with the polymerization solution at the end of the polymerization reaction. This contact and vigorous mixing can be effected by adding the hydrogen gas through spargers in a mixing vessel containing polymer solution. The time of contact should be at least about ten seconds and preferably about twenty minutes to allow sufficient contact time for the reaction to occur. This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in an appropriate solution and added to the polymer solution to be terminated. Another method would be to cause the hydrogen to be absorbed into an absorption bed an then cause the polymer solution to flow through the absorption bed. The hydrogen contact could also be carried out by adding a material which gives off hydrogen upon decomposition, i.e. diimide.

As stated above, the hydrogenation step of the present process is carried out in the presence of a bis(cyclopentadienyl)titanium compound of the formula set forth above. The hydrogenation step is carried out in the absence of hydrocarbon lithium and alkoxy lithium compounds. Specific bis(cyclopentadienyl) compounds which may be used are described in U.S. Pat. No. 5,291,990.

This process will selectively hydrogenate conjugated diolefins without hydrogenating alkenyl aromatic hydrocarbons to any degree. Hydrogenation percentages of greater than 50% are easily obtained but it has been found that in order to achieve hydrogenation percentages of greater than 95% as is often desired, for many polymers the alkali metal hydride (for example, lithium) to titanium ratio must be at least about 6:1 and can be up to about 30:1. There has to be sufficient alkali metal hydride to ensure quick and sufficient interaction between the two metals. However, since the amount of alkali metal hydride, usually lithium, is fixed by the amount needed for polymerization, often times there is too much hydride produced during the termination step and it is advantageous to add another reagent to react with the alkali metal hydride to boost catalytic activity.

Generally, polymers with molecular weights of less than about 100,000 (and possibly higher if the solids content of the polymer solution is high) may very well have excess alkali metal (lithium) hydride present after termination. Since the alkali metal (lithium) hydride:-titanium ratio is important in this process, the amount of titanium that is added determines the amount of excess alkali metal (lithium) hydride as well as polymer molecular weight and concentration of polymer in solution. The ratio can be no less than about 6:1.

The terminated polymer, preferably in solution, is treated with one of the following reagents. The reagents may be selected from the group consisting of $R_xSiX_{4-x}$ where X is a halogen and x is 0–3, including silicon tetrachloride, difluorodiphenyl silane, dimethyldichloro silane, and silicon hexachloride; alcohols, including methanol, ethanol, isopropanol and 2-ethyl-1-hexanol; carboxylic acids including 2-ethyl-1-hexanoic acid; phenols including 4-methyl-phenol; water; and halogen-containing hydrocarbons including dirbromethane. Generally, only a small amount of the reagent is need to react with the lithium hydride in the polymer solution to effectively boost catalyst activity and increase hydrogen conversions. These reactions are rapid which helps to eliminate any delay in process cycle time.

The polymer must be treated with at least some of the reagent but not more than that amount which will achieve an alkali metal (lithium) hydride to titanium ratio of 6:1. If more of the reagent is used and the alkali metal (lithium) hydride to titanium ratio is lowered, the hydrogenation conversion falls off. Generally, this means that the molar ratio of the reagent to the titanium in the polymer should not be more than about 2:1 and it probably can be much less depending upon the equivalents of reactive sites available on the reagent molecule. For instance, dibromoethane appears to have two reactive sites whereas silicon tetrachloride appears to have four reactive sites, i.e. the halogen atoms may be removed and replaced by hydrogen. Depending upon the reagent used, it may be that not all of the reactive sites are sterically available or reactive such as in the case of silicon tetrachloride. As the molecular weight of the polymer increases, less reagent will be needed to achieve the advantages of the present invention and as the molecular weight goes down, more reagent will be needed. The reason for this is that there is less lithium initiator needed per weight of polymer as the molecular weight of the polymer increases. This results in less lithium hydride per polymer weight following hydrogen termination of the polymerization.

For example, in a 50,000 molecular wight styrene-butadiene-styrene block copolymer (20% wt. polymer in solution) made using hydrogen termination, the lithium hydride level was determined to be about 33 ppm, solution basis. Silicon tetrachloride was the reagent of choice and it was used in an amount equal to 100 ppm, solution basis. The molar ratio of LiH:Ti was 11:1 and that of $SiCl_4$:Ti was 2.0:1. The hydrogenation using the silicon tetrachloride increased to 96% conversion of the olefinic double bounds versus 92% conversion without the silicon tetrachloride.

In general, the hydrogenation is carried out in a suitable solvent at a temperature within the range of from about 0° to about 120° C., preferably about 60 to about 90° C., and a hydrogen partial pressure within the range from about 1 psig to about 1200 psig, preferably from about 100 to about 200 psig. Catalyst concentrations within the range from about 0.01 mM(millimoles) per 100 grams of polymer to about 20 mM per 100 grams of polymer, preferably 0.04 to 1 mM catalyst per 100grams per polymer, are generally used and contacting at hydrogenation conditions is generally continued for a period of time within the range from about 30 to about 360 minutes. Suitable solvents for hydrogenation include, among others, n-heptane, n-pentane, tetrahydrofuran, cyclohexane, toluene, hexane and benzene. Because of the small amount of catalyst present in the polymer after hydrogenation, it is not necessary to separate the hydrogenation catalyst and catalyst residue from the polymer. However, is separation is desired, it may be carried out using methods well known in the prior art. Hydrogenation may be carried out in other manners such as batch processes, continuous processes, and semi-continuous processes.

EXAMPLES

A 600 lb. batch of polystyrene-polybutadiene-polystyrene (S-B-S$^-$-Li$^+$) block copolymer 50,000 molecular weight (total peak MW determined by GPC) was made by anionic polymerization using sec-butyllithium as the initiator in a 150 gallon pressurized reactor. The polymerization took place in a mixture of cyclohexane and diethyl ether. The resulting polymer solution contained 20% polymer by weight. At the end of the polymerization reaction, the reactor temperature was approximately 60° C. The reactor was sparged with hydrogen for approximately 20 minutes to terminate the polymerization.

Various amounts of reagents as described in Table 1 were added to polymer solutions prior to hydrogenation and titanium catalyst addition. The experimental hydrogenation runs consisted of pressure transferring to a 4-liter reactor 1560 g of a 20% by weight solution of polymer. This solution contained 6,5 mM of LiH or 33 ppm LiH, solution basis. The reagents to promote activity were added to the polymer solution in the amounts shown in the table below. The temperature of the reactor was maintained at 75° C. At this point, 0.125 g or 0.5 mM of the catalyst, bis(cyclopentadienyl)titanium dichloride (Cp$_2$TiCl$_2$), was added to the reactor as a toluene or cyclohexane slurry. If no reagent were added, the LiH:Ti molar ratio would be 13:1. After addition of the catalyst, the reactor was pressurized to 140 psig with hydrogen gas. The reaction was allowed to run for 3 hours, during which time samples were drawn from the reactor and analyzed by proton NMR to determine final percent conversion of olefin. Gel Permeation Chromatography (GPC) was done on final samples to determine if there had been any changes in molecular architecture.

| Reagent | Amount ppm, Solution Basis | Reagent:Ti Molar Ratio | LiH:Ti Molar Ratio | Conversion at 3 hours (%) |
| --- | --- | --- | --- | --- |
| Control-No Reagent | 0 | 0 | 13 | 92 |
| Dibromoethane | 64 | 1.1 | 12 | 95 |
| Dibromoethane | 244 | 4.0 | 5 | 12 |
| Silicon Tetrachloride | 100 | 2.0 | 11 | 96 |
| Difluorodiphenyl Silane | 122 | 1.7 | 11 | 99 |
| 2-ethyl-1-hexanol | 50 | 1.2 | 11 | 96 |
| 2-ethyl-1-hexanoic acid | 10 | 0.2 | 13 | 97 |
| Methanol | 3 | 0.3 | 13 | 97 |
| Water | 50 | 9 | 4 | 91 |

The results shown in the above table indicate that treatment of the polymer solution with the reagents of the present invention increases the conversion of the olefinic double bonds when compared to the control experiment in which no reagent was added. We believe that the experiment performed with 244 ppm of dibromoethane achieved poor results because the lithium hydride level was reduced too much, in essence lowering the level outside of the operable range for effective hydrogenation using this catalyst system or the reagent:Ti molar ratio was too high. Water decreased the LiH:Ti ratio below 6:1 and adversely affected the % conversion. It is believed that the reason is that the amount of water used was much too high. Lower levels should result in improved conditions.

We claim:

1. In a process for the hydrogenation of conjugated diolefin polymers which comprises:
   (a) polymerizing or copolymerizing at least one conjugated diolefin with an organo-alkali metal polymerization initiator in a suitable solvent thereby creating a living polymer an alkali metal hydride,
   (b) terminating the polymerization by the addition of H$_2$ prior to hydrogenation, and
   (c) selectively hydrogenating the unsaturated double bonds in the conjugated diolefin units of said terminated polymer by contacting the polymer, in the absence of hydrocarbon lithium and alkoxy lithium compounds, with hydrogen in the presence of at least one bis(cyclopentadienyl)titanium compound of the formula:

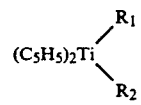

wherein R$_1$ and $_2$ are the same or different and are selected from the group consisting of halogen groups, C$_1$–C$_8$ alkyl and alkoxy groups, C$_6$–C$_8$ aryloxy groups, aralkyl, cycloalkyl groups, silyl groups and carbonyl groups; the improvement which comprises treating the terminated polymer with a small but effective amount of a reagent which will react to reduce the amount of alkali metal hydride in an amount which will decrease the alkali metal hydride to titanium ratio in the terminated polymer to no less than 6:1 to boost catalyst activity and increase hydrogen conversion.

2. The process of claim 1 wherein the reagent is added such that the molar ratio of reagent to titanium is no more than about 2:1.

3. The process of claim 1 wherein the polymer has a molecular weight of less than about 100,000.

4. The process of claim 1 wherein the reagent is selected from the group consisting of R$_x$SiX$_{4-x}$, where X is halogen and x is 0–3, silicon hexachloride, alcohols, phenols, carboxylic acids, water and halogen-containing hydrocarbons.

5. The process of claim 4 wherein the reagent is selected from the group consisting of silicon tetrachloride, difluorodiphenyl silane, dimethyl dichlorosilane, methanol, ethanol, isopropanol, 2-ethyl-1-hexanol, 2-ethyl-1-hexanoic acid, 4-methyl phenol, dibromoethane and water.

6. The process of claim 1 wherein the hydrogenation is carried out at a temperature from about 0° C. to about 120° C. and a pressure of from about 1 psig to about 1200 psig and the catalyst concentration is from about 0.01 mM to about 20 mM of titanium per 100 g of polymer and the contacting takes place for a period of time within the range from about 15 to about 1440 minutes.

7. The process of claim 1 wherein the alkali metal initiator is an organo lithium compound.

8. The process of claim 7 wherein the organo lithium compound is sec-butyllithium.

9. The process of claim 1 wherein the titanium compound is selected from the group consisting of bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium dicarbonyl, bis(cyclopentadienyl)titanium dimethyl, bis(cyclopentadienyl)titanium diethyl, bis(cyclopentadienyl)titanium dibutyl, bis(cyclopentadienyl)titanium bis(trimethylsilylmethyl), bis(cyclopentadienyl)titanium dibenzyl, bis(cyclopentadienyl)titanium dihexyl, bis(cyclopentadienyl)titanium dimethoxide, bis(cyclopentadienyl)titanium diethoxide, bis(cyclopentadienyl)titanium dibutoxide, bis(cyclopentadienyl)titanium dipentoxide, bis(cyclopentadienyl)titanium dineopentoxide, bis(cyclopentadienyl)titanium dephenoxide and all mixtures thereof.

10. The process of claim 9 wherein the titanium compound is bis(cyclopentadienyl)titanium dichloride.

11. The process of claim 1 wherein the alkali metal hydride:titanium metal ratio during the hydrogenation is at least 6:1.

12. The process of claim 1 wherein the conjugated diolefin is selected from the group consisting of butadiene and isoprene.

13. The process of claim 1 wherein the diolefin is copolymerized with a vinyl-substituted aromatic hydrocarbon.

14. The process of claim 13 wherein the diolefin is copolymerized with a monomer selected from the group consisting of styrene and styrene derivatives.

15. The process of claim 14 wherein the copolymer is a block copolymer having at least one conjugated polymer block and at least one styrene or styrene derivative block.

16. The process of claim 1 wherein at least 95% of the unsaturated bonds in the conjugated units are hydrogenated.

* * * * *